United States Patent

Vinciguerra

[11] Patent Number: 5,255,718
[45] Date of Patent: Oct. 26, 1993

[54] CRANK LEVER FOR LOOM LINKAGES

[75] Inventor: Costantino Vinciguerra, Florence, Italy

[73] Assignee: Nuovopignone-Industrie Meccaniche e Fonderia S.p.A., Milan, Italy

[21] Appl. No.: 944,895

[22] Filed: Sep. 15, 1992

[30] Foreign Application Priority Data

Sep. 20, 1991 [IT] Italy .................. MI91 A 002517

[51] Int. Cl.$^5$ .................................................. D03C 1/14
[52] U.S. Cl. ........................................ 139/66 A; 139/82; 74/519
[58] Field of Search ................ 139/66 R, 66 A, 82; 74/519

[56] References Cited

U.S. PATENT DOCUMENTS

| 3,946,766 | 3/1976 | Amigues | 139/66 R |
| 4,546,800 | 10/1985 | Froment | 139/82 X |
| 5,044,407 | 9/1991 | Vinciguerra | 139/66 A |

FOREIGN PATENT DOCUMENTS

| 0393750 | 10/1990 | European Pat. Off. |  |
| 1523702 | 9/1942 | Fed. Rep. of Germany . |  |
| 2943711 | 5/1981 | Fed. Rep. of Germany . |  |
| 2599056 | 11/1987 | France | 139/66 A |

Primary Examiner—Andrew M. Falik
Attorney, Agent, or Firm—Morgan & Finnegan

[57] ABSTRACT

A crank lever for loom linkages, comprising a body of high-strength aluminum plate with a central hole and grooves on the inner and outer body faces adjacent the hole. A central annular rotation and thrust-bearing hub of steel surface-hardened by heat treatment is inserted into said hole and locked therein by simple compressive plastic deformation of its outer annular edge facilitated by the grooves.

1 Claim, 2 Drawing Sheets

CRANK LEVER FOR LOOM LINKAGES

BACKGROUND OF THE INVENTION

1. Field of the Invention

This invention relates to a new crank lever which, being extremely light and hence of low inertia although very strong, is particularly suitable for application to the dobby-heddle frame connection of modern looms which are required to operate at increasingly high speed.

2. Description of the Related Art

It is known that in transmitting the dobby commands to the heddle frames of a loom, a double series of crank levers is used in which the levers of each series are positioned adjacent to each other and are pivoted on the same shaft.

Said crank levers are currently constructed of steel or cast iron in one piece by forging or casting, and are therefore very heavy. In view of the current tendency towards increasingly high speed, it has been sought to lighten the moving members of the loom as much as possible, and in particular these crank levers.

However, constructing a crank lever of aluminum in one piece by casting, which would be expected to achieve the required lightness, would in this case not be possible as cast aluminum cannot be guaranteed to possess the necessary fatigue strength because of the possible presence of porosity in the cast material or of actual casting defects, such strength however being required because of the high dynamic loads which arise at the current high speeds of modern looms. In addition, such a crank lever could not, as is necessary, comprise an annular region at the lever centre of rotation which is sufficiently hard to reduce friction and wear to a minimum, said central annular region having to act both as a rotation bearing and a thrust bearing for adjacent crank levers.

SUMMARY OF THE INVENTION

The object of the present invention is to obviate said drawbacks by providing a crank lever which combines lightness and hence very low inertia with high surface hardness of its central region. This object is substantially attained in that the crank lever is constructed in two parts, of which the lever body comprising the central hole is formed from low-weight high-strength aluminum plate while the central region consists of an annular rotation and thrust-bearing hub of preferably forged steel, surface hardened by preferably thermochemical treatment, said surface-hardened steel hub being inserted into said central hole of the aluminum body and locked to said aluminum body not by welding but by compressive plastic deformation of its outer annular edge, which comprises thereat a cross-sectional restriction determined by a groove in both hub faces to facilitate plastic compression of said annular edge and hence locking by interference between the lateral surface of said edge, which consequently expands in a radial direction, and the corresponding lateral surface of said aluminum body, and prevents the propagation of any deformation beyond said restriction from the interior of the hub, the purpose of which is to act as a rotation and thrust bearing. In this manner a lever is obtained having extremely low inertia because the only truly heavy body is the steel hub, which however because of its extreme closeness to the centre of rotation has little influence on the total inertia. Again, it is now possible for the central rotation region to be hardened because the surface-hardened of the steel hub does not produce fracture or cracking during pressing, as the plastic deformation produced by this latter is only of compression, without deleterious tension or flexure.

The invention is described in detail hereinafter with reference to the accompanying drawings, which illustrate a preferred embodiment thereof by way of non-limiting example only, in that technical or constructional modifications can be made thereto but without leaving the scope of the present invention.

DESCRIPTION OF THE PREFERRED EMBODIMENT

Figure 1:
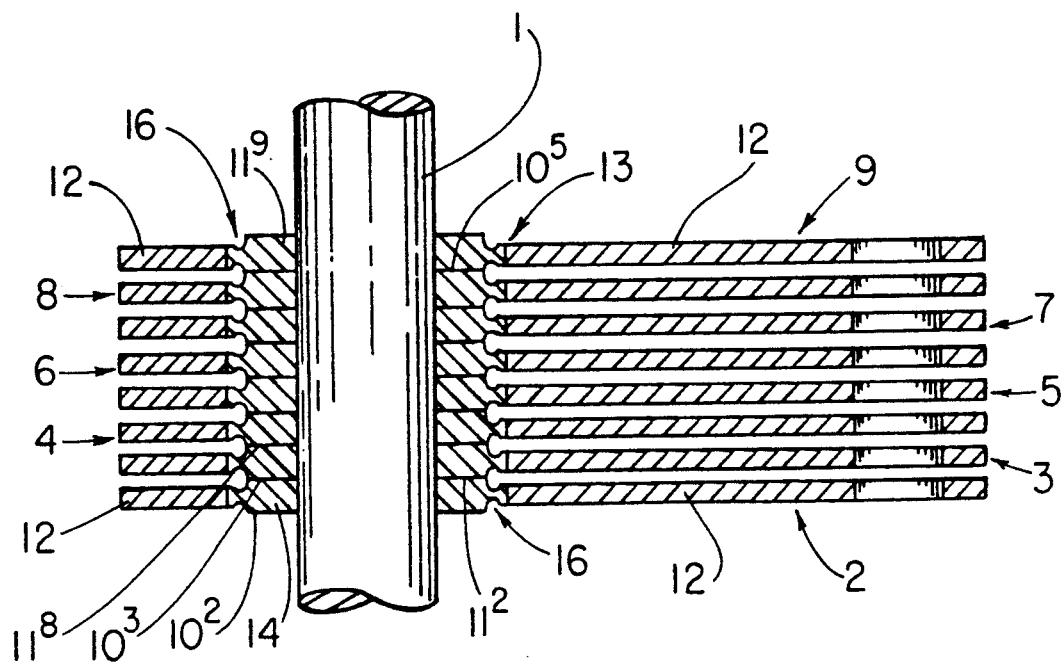
FIG. 1 is a top sectional view through a pack of crank levers constructed in accordance with the invention and as used in looms.
Figure 2:
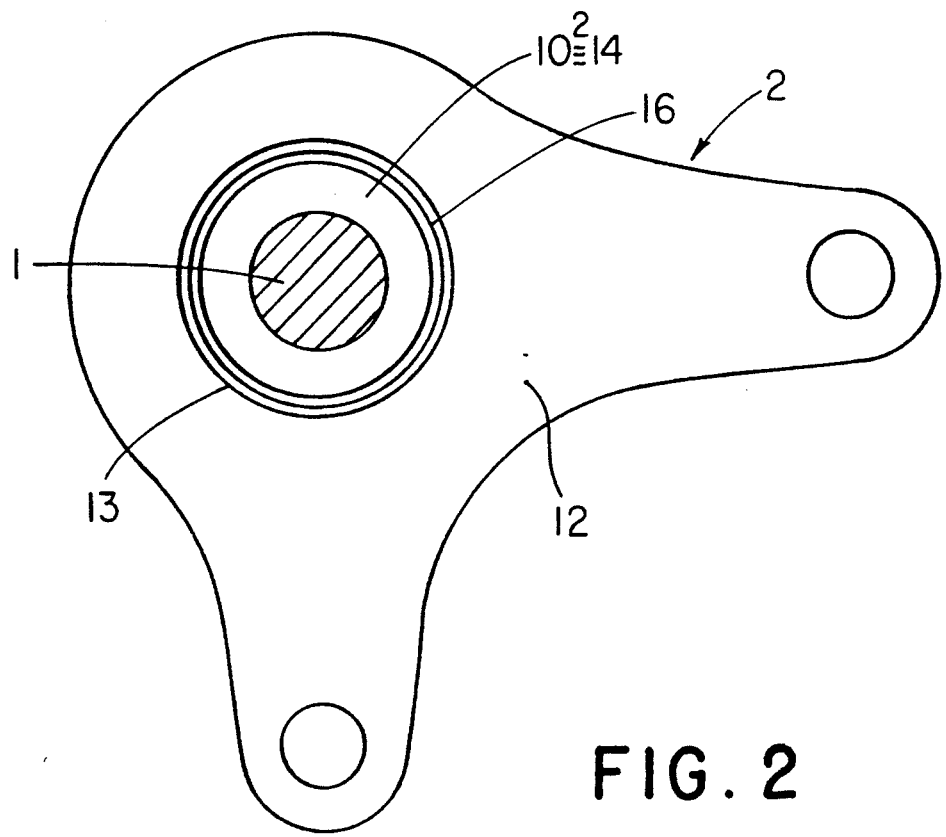
FIG. 2 is a front view to an enlarged scale of one of the crank levers of FIG. 1.
Figure 3:
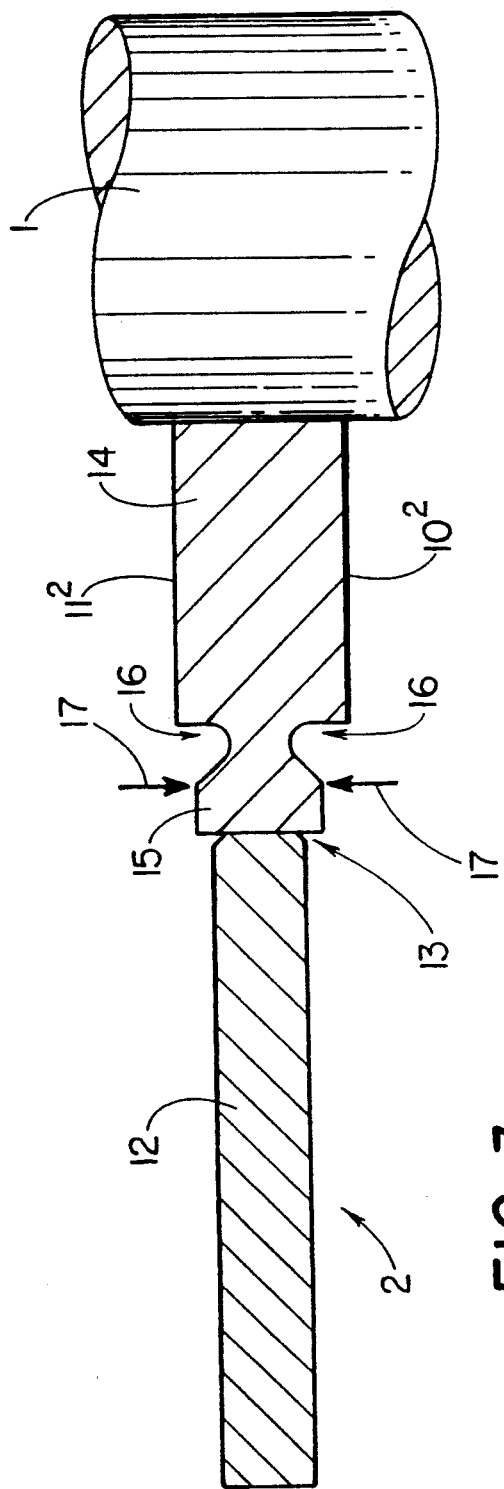
FIGS. 3 and 4 are highly enlarged sectional views of part of the lever of the invention before and after locking the central hub to the lever body respectively.
Figure 4:
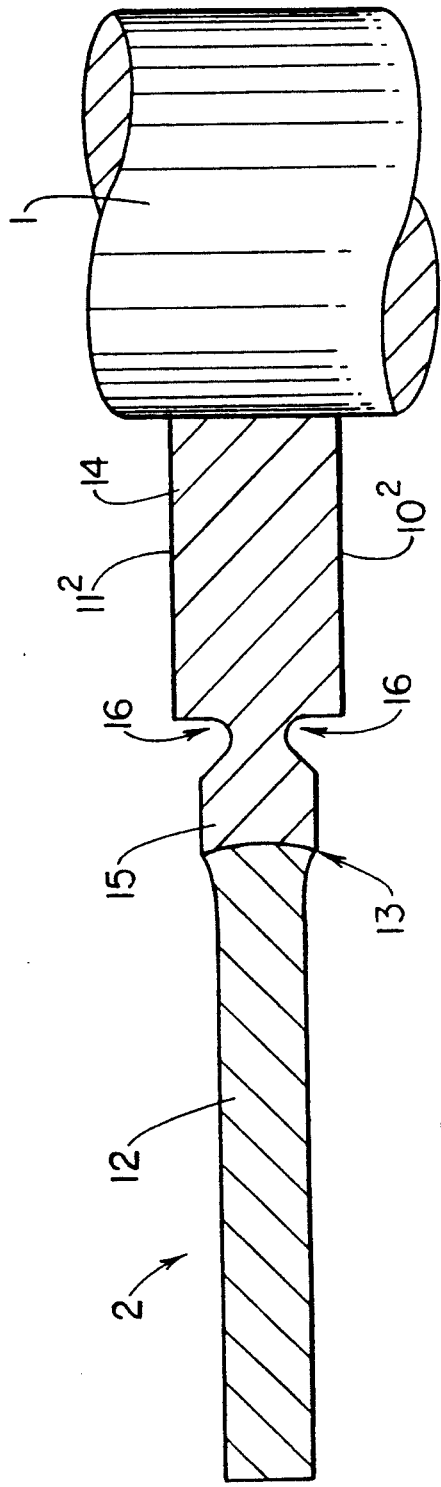

In the figures the reference numeral 1 indicates the shaft onto which the pack of crank levers 2, 3, . . . , 9 is idly mounted, these being in mutual contact via their central annular thrust-bearing surfaces $10^i$ and $11^i$, where i varies from 2 to 9. Each crank lever comprises a light lever body 12 with a central hole 13, formed by blanking from a high-strength aluminum plate, and a central annular rotation hub 14 comprising said thrust-bearing surfaces $10^i$ and $11^i$, inserted into said hole 13. Said hub 14 is constructed of forged steel and is surface-hardened by thermochemical treatment. In proximity to its outer annular edge 15 it is provided with a groove 16 in both faces to form a restriction in its cross-section, and is rigidly locked to said aluminum body 12 by plastic compression by means of forces 17 (see specifically FIG. 3) against said annular edge 15, which hence interferes with the lateral surface of said hole 13 as clearly shown in FIG. 4.

What is claimed is:

1. A crank lever for loom linkages, comprising a lever body of high strength aluminum plate with a central hole, and a surface-hardened central annular rotation and thrust-bearing steel hub inserted into said central hole of the aluminum body, said hub including a front and rear face with a groove on each surface located adjacent to an annular outer edge, said body being locked to said edge by a rigid connection defined by a compressive plastic deformation of said edge facilitated by said grooves.

* * * * *